Sept. 29, 1931.     G. SOMAJNI     1,825,100
ELECTRIC CONTROL APPARATUS
Filed Jan. 19, 1929     3 Sheets-Sheet 2

Inventor
GIACOMO SOMAJNI

Patented Sept. 29, 1931

1,825,100

UNITED STATES PATENT OFFICE

GIACOMO SOMAJNI, OF MILAN, ITALY

ELECTRIC CONTROL APPARATUS

Application filed January 19, 1929, Serial No. 333,605, and in Italy January 31, 1928.

This invention relates to electric control apparatus, and more particularly to apparatus for the control of electric traction motors.

The invention has for its principal object to provide improved apparatus of the kind in which starting and braking control of traction motors is effected by means of so-called dynamotors, which serve to vary the potential applied to the motors to be controlled.

It is well known that by employing a dynamotor to control the potential applied to one or more compound wound traction motors, so that during the starting of the said motors they are submitted to a scale of progressively increasing voltages, it is possible to start, say, a train, without employing rheostats. Similarly, a train may be braked a very low speed by submitting the motors in like manner to a corresponding scale of decreasing voltages.

In apparatus of this kind, regeneration is, of course, obtained, the said regeneration being automatic; that is to say, there is no need for any particular operation to be effected by the motorman in order to regenerate, since the same positions of the controller serve alike for starting and braking, regeneration being able to occur in any working position of the controller.

Further, in order to reduce the "peaks" of current in the motors and to avoid consequent jerking, it is also known to insert a small rheostat in the armature circuit of the motors, the said rheostat remaining in circuit during the passage from one voltage to another, and being short-circuited automatically by a special differential relay when the current has diminished to predetermined value.

With apparatus in accordance with the present invention the current peaks which occur during passage from one voltage to another are still further reduced, and thus the running of the vehicle to be controlled is rendered more regular both in starting and braking.

The compound wound motors used in multiple-voltage regulation systems, such as the dynamotor system referred to, undergo a diminution of the strength of the magnetic field when the current, flowing through its armature, is interrupted. If now one throws a pressure upon them greater than that previously applied, so that a stronger current will pass through said armature, this pressure will find a weak field, and in the first moment a current far greater than the normal one will pass through the motor. This current increases the field strength and the current itself diminishes to the normal value; but the transient increase of current has caused an increase of driving couple and also jerking of the vehicle. While braking, the motor operates as a generator and its series excitation reduces its field strength. An interruption of armature current permits an increase of field strength and when a pressure lower than the first one applied is thrown upon the armature, the motor will generate a strong current. This current will thereafter reduce the strength of the field and then also the current itself, but, in the first moment, there will be a current peak and then a jerking of the vehicle, as stated before.

The object of the present invention is to provide a system of motor control which avoids these drawbacks. According thereto, the shunt excitation of the motors is temporarily increased when the pressure applied to the armature is increased while accelerating, and said excitation is temporarily diminished when the pressure applied to the armature is diminished while braking. Thus, when the different pressure is applied to the motor, it is capable of withstanding it without producing current peaks and jerks. After a certain time, when the current is diminished and the motor speeded up, the excitation is again made normal and the motor then supports the new pressure applied without any trouble.

The various novel features of the invention will appear from the description and drawings, and will be more particularly pointed out in the claims:

Figure 1:
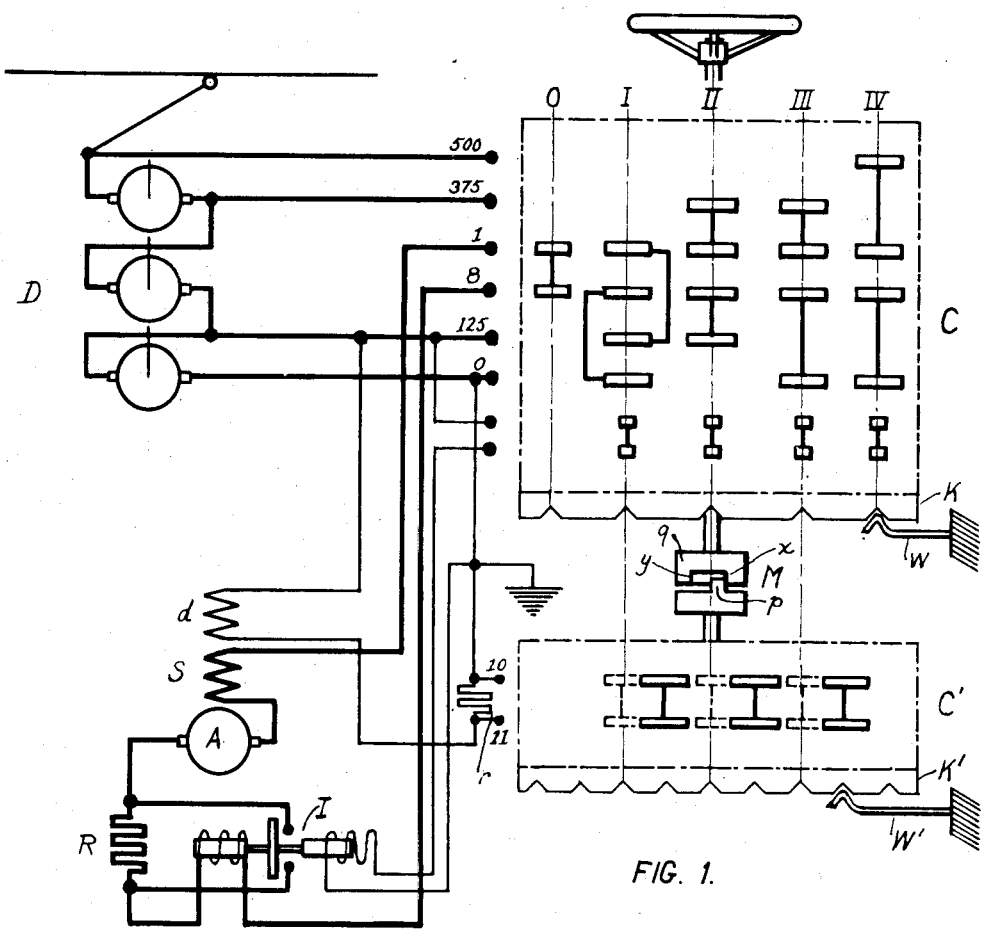
Figure 1 is a diagrammatic view of a motor control having a resistance in the shut excitation, and a lost-motion controller drum short-circuiting said resistance. A differential relay of known type short-circuits another resistance inserted in the armature circuit.

In the arrangement shown in Fig. 1, it is assumed, for the sake of simplicity, that there is merely a single motor to be regulated, the said motor being subjected to, for example, voltages of 0—125—250—375—500 during starting and conversely to voltages of 500—375—250—125—0 during braking.

C is the drum of the main controller, and is provided with brushes 0, 125, 375, 500, permanently maintained by a multiple-voltage supply, for example, a dynamotor, at the voltages 0, 125, 375, 500, and with brushes 1 and 8 from which the armature circuit of the motor is fed.

If the drum is turned clockwise, i. e. such that the brushes 1, 8, 125 pass from contacts O to contacts I, then to contacts II, and so on, the tongue $p$ is driven by the wall $x$ of the groove of disc $q$ and the relative position of the drums is such that a set of contacts on drum C' corresponds to an interval between two sets of contacts on drum C. If, on the other hand, the drum is turned counterclockwise, then tongue $p$ is driven by the wall $y$ of the groove, and the relative position between the drums is such that sets of contacts on both drums C and C' correspond one to another.

The first direction of rotation corresponds to starting and it will be seen from the figure that the weakest shunt excitation (i. e. resistance $r$ inserted) is obtained when the drum C is in one of the setting positions while the strongest shunt excitation (i. e. resistance $r$ short-circuited) is obtained during the passage from one setting position to the next. In motoring, the motor is thus over-excited during passage from one setting position to the other.

The second direction of rotation corresponds to braking. In this direction, the contacts upon the drum C' are displaced towards the left with respect to the position indicated in the drawings to an extent necessary to ensure that the contacts upon the drum C' lie on the same mean line, as the contacts upon the drum C. The first rotation of drum C with respect to drum C', due to the relative motion allowed by the claw coupling M, must obviously equal half the angular distance between each setting position and the following. Thus, under these conditions, the motor becomes over-excited while the drum C is in any one of the setting positions, and under-excited during passage from one position to the next, so that the said motor becomes underexcited before the principal contacts are established and the braking current exerts its underexciting action. A similar phenomenon is produced during starting, the motor being over-excited before the compound action exerted by the starting current is produced, after the principal circuits have been closed. The advantages obtained from the present invention are:

(a) The current peaks are reduced, since the closing of the principal circuits after each change of connections is preceded by a state of over-excitation of the motors in motoring and under-excitation in braking.

(b) The current to be interrupted is reduced partly by the automatic introduction of the resistance R and partly by the variation in excitation referred to in (a) above.

(c) There is provided greater excitation during braking than during motoring. During motoring, indeed, the series excitation is added to the shunt excitation, whereas, during braking, it is subtracted.

Figure 2:
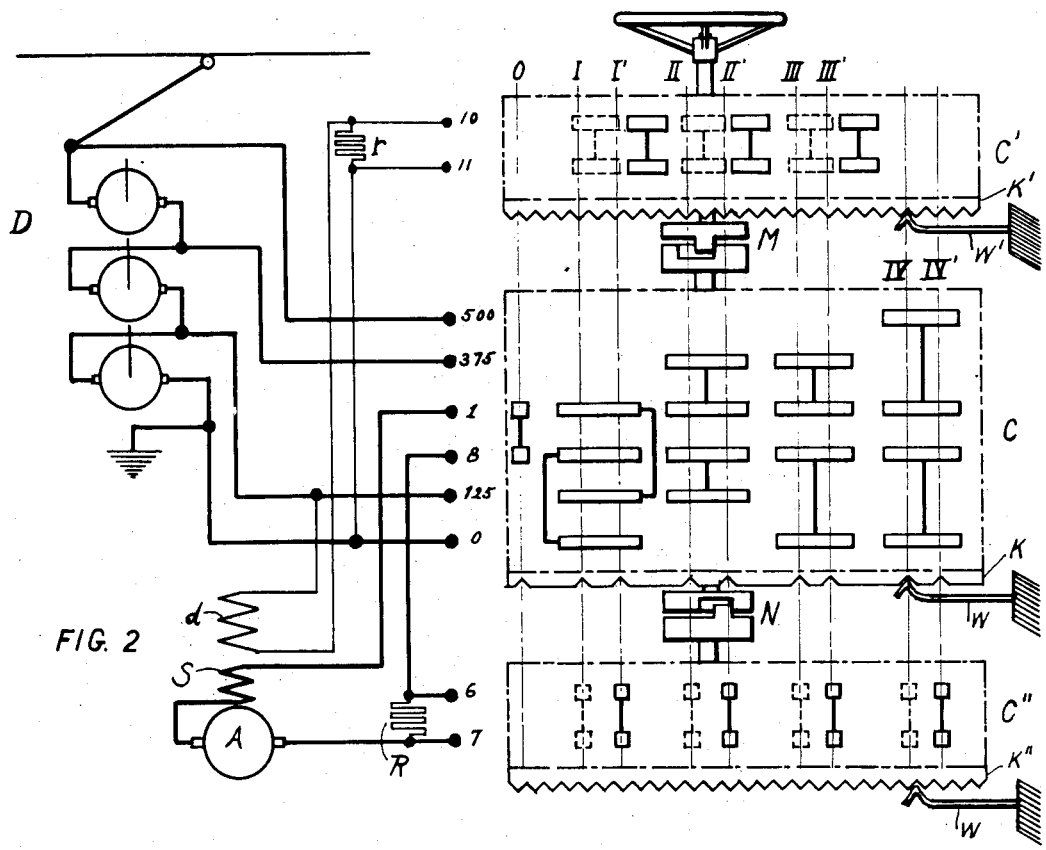
Fig. 2 is a similar view, in which both the resistances of the shunt excitation and of the armature circuit are short-circuited, each by a lost-motion controller drum.

A similar arrangement may be employed for short-circuiting resistance R of the armature circuit, which, in Fig. 1, was assumed to be short-circuited by a common differential relay I. Fig. 2 shows such an arrangement, in which an auxiliary drum C'' carries sliding contacts which short-circuit brushes 6, 7 and thus resistance R. This drum is operatively connected with drum C by means of a claw coupling N similar to that of M described above. The setting positions of drum C are split in two and the contacts on drum C'' are fixed such as to touch their brushes only on one of said split setting positions, which are shown in I, I'—II, II'—III, III'. In this arrangement there are two auxiliary drums C', C'', which are operatively connected with the main drum C or with its shaft, each by means of a claw coupling M, N. These claw couplings each comprise, as stated above, two discs, one of which presents a diametrical groove, while the other has a tongue engaging with the groove of the first disc. The groove is larger than the tongue, so that a certain relative motion is allowed between a couple of the engaging discs. Drums C', C'' then follow the rotation of drum C in whatever direction with a certain lag. The relative motion between drums C and C' is kept equal to half the angle between two successive analogous setting positions of the controller, such as I and II or II' and III'. The relative motion between drums C and C'' is kept equal to the angle between two successive setting positions of said controller, such as I and I', II and II', etc.

On drums C' and C" contacts are provided, adapted to short-circuit the fixed brushes. Contacts of drum C' short-circuit brushes 10, 11 and then resistance $r$ inserted on the shunt circuit of the excitation of the motor, and contacts of drum C" short-circuit brushes 6, 7 and then resistance R inserted in the armature circuit.

Thus, due to the relative motion between the drums connected by the claw coupling M, resistor $r$ is made operative while motoring in every setting position of the controller, while it is short-circuited during the passage from one position to another, such as I'—II, II'—III, III'—IV, i. e. when the armature circuit is broken, while resistor $r$ is made operative during said passages and short-circuited in all of the setting positions while braking. The relative angular position between drums C and C" is such that while motoring R is made operative in setting positions as I, II, III, IV, and short-circuited in the others, which are the second met with of double setting positions, and while braking R is made operative in such setting positions as I', II', III', IV', which are then the first position met with, and short-circuited in the others. Moreover, both while motoring and braking, R is made operative during the switch-over of the armature circuit.

For clearness sake, the relative positions of drums C' and C", with respect to main drum C while motoring (clockwise rotation of C), are shown in full lines; and the same positions while braking (counterclockwise rotation of C) are shown in dotted lines. In order that the relative position between the various drums be maintained during rotation, it is not sufficient to provide a notched disc E on the main controlling drum C, and a spring catch W to stop the main drum in the exact positions. One must also provide means adapted to prevent the auxiliary drums C', C" from running before their theoretical positions, which are conveniently displaced backwards with respect to that of the main drum C. Such means consist of notched discs K' and K" for the auxiliary drums C', C" and corresponding spring catches W' and W" adapted to compel said drums to keep the correct position. For this purpose stops are mounted on the casing of the controller and engage with the notches of said discs; whereunto said stops are provided with a strong spring capable of exerting on the notched disc a sufficient resistance, i. e. a moment of resistance greater than the moment of torsion exerted on the disc by the friction between the elements of the claw coupling (M or N).

Let us suppose the circumference divided into 27 parts. Disc K will only be provided with such notches as are necessary for fixing the positions 0—I—I'—II—II'—III—III'—IV—IV', while each of the discs K' and K" has 27 notches so that their setting is always definite, for in the case exemplified, the lost motion at every rotation reversal of C is of three steps for C' and of only two steps for C".

As to the operation of the device it is enough to point out that both during the starting period and during braking, each voltage is applied to the armature first with R switched-in and after with R short-circuited, what causes a reduction of the current jerks on stepping from one applied voltage to the other.

Naturally this arrangement is also applicable to the case in which two or more motors are coupled in series or in parallel. The number of voltage steps to apply to the armatures of said motors can also vary; this requires only a variation in the number of contacts mounted on drum C and in the number of control positions, but not in the structure and relative bearing setting of drums C'—C", in which only the number of contacts has to be correspondingly increased.

Figure 2A:
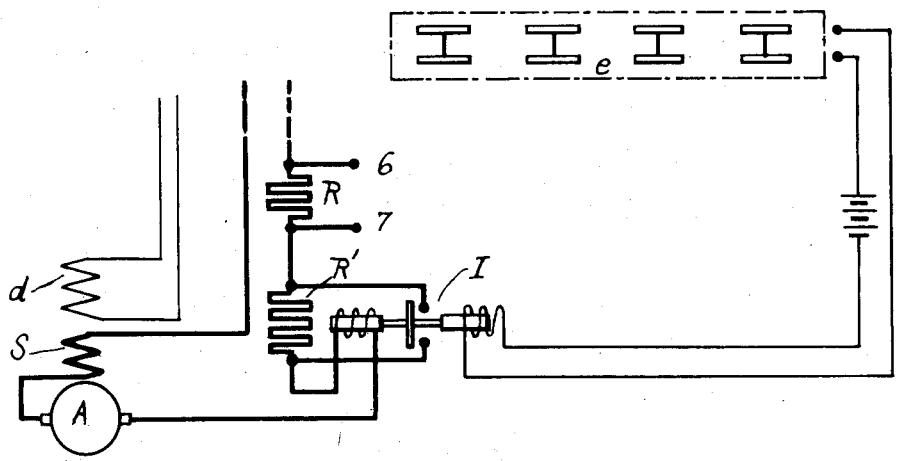
Fig. 2a is a similar view showing a relay operating circuit.

A part R' of the resistances of the armature circuit can also be controlled by a relay I operating before or after (see Fig. 2a), while the other part will be controlled directly by the controller. If said relay must operate before for short-circuiting the part of R depending on the same, the contacts $e$ which operate the differential relay must be fixed on drum C and must be switched in circuit either in positions I—II—III—IV or in positions I'—II'—III'—IV'.

If on the contrary, said relay must operate after, said contacts will have to be arranged on C" in a similar way to those short-circuiting brushes 6—7, so that on starting, the differential relay operates only in I'—II'—III'—IV' and in braking in I—II—III—IV.

Finally it must be pointed out that a motor excited in series operates exactly in the same way as a simple resistance. Consequently resistance R can be either totally or partially replaced by a series motor Z (see Fig. 3), capable of creating a proper counter-electromotive force, said motor being keyed on the shaft of the dynamotor D operating as voltage-splitter and providing the fundamental voltages 125, 250 and 375.

Said motor will be switched in the circuit in the exact point in which is inserted that part of resistance R which has to be replaced by said motor. In such a case the energy absorbed by said motor is not totally spent in heat: on the contrary it is regenerated and sent back into the circuit through the dynamotor operating as voltage-splitter, on whose shaft said auxiliary motor is keyed.

Figure 3:
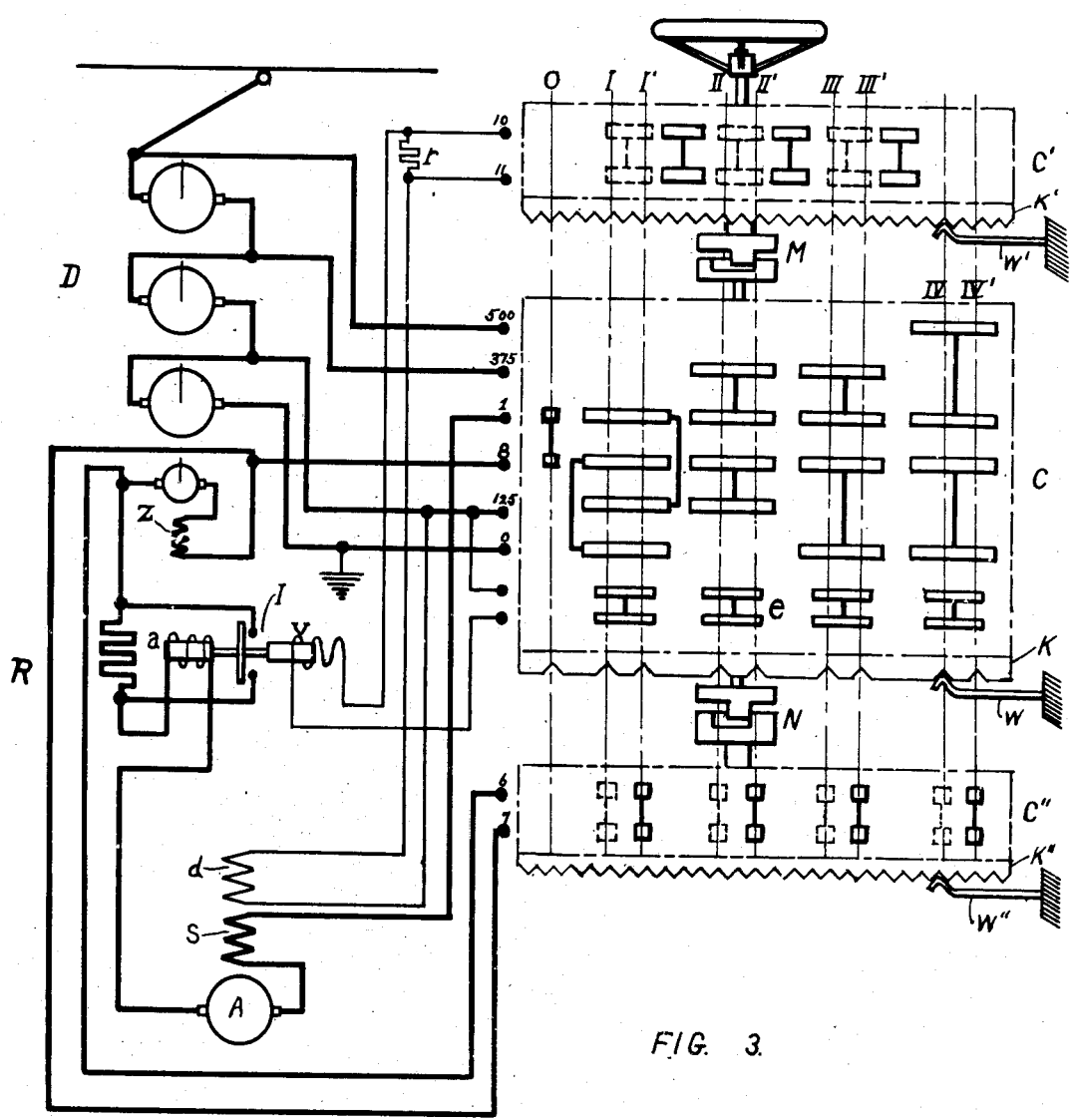
Fig. 3 is another diagrammatic view, in which the shunt excitation circuit of the motor has a resistance which is short-circuited by a lost-motion drum, whereas a resistance and a regulating motor are inserted in the armature circuit, said resistance being, by way of example, short-circuited by a known differential relay and the regulating motor becoming short-circuited by a lost-motion drum.

In Fig. 3, there is shown, by way of example, a simple manner of carrying out the invention. The running motor A has a series winding S and a shunt winding $d$; in the circuit of the latter there is a resistance $r$ which may be short-circuited by the auxiliary drum C' of the controller. In the armature circuit are inserted a resistance R and a regulating motor Z. Resistance R may become short-circuited by a differential relay I, such as are generally known; motor Z, instead, is connected to another auxiliary drum C'' of the controller, which short-circuits it, as stated before.

The motor Z is series excited and its armature is keyed on the shaft of the dynamotor D, rotating, therefore, at the same speed as the dynamotor, i. e. at a constant speed and always in the same sense. The insertion of its field winding is such that for the given direction of rotation it operates as a motor, whatever the direction of the current may be; it generates, therefore, in any case a fall of pressure in the same direction of the current, which passes through it. This results in an absorption of an amount of energy from the current which is proportional to the current itself, and this energy is transmitted mechanically to the dynamotor, which transforms it again into electric current and supplies it to the main circuit. Thus motor Z acts both when motoring and when braking as a regulator of current, and could be kept permanently in the circuit, thereby avoiding the short-circuiting means shown in Fig. 3.

If, on the contrary, one will short-circuit Z and R, as shown in Fig. 3, it should be convenient to maintain the motor in action longer than the resistance. Therefore, relay I, short-circuiting the latter, should have its voltmetric coil $v$ supplied from the main drum C through contacts $e$, while the amperemetric one $a$ is inserted in the armature circuit of both motors. Contacts $e$ should for the same reason cover both positions I, II, III ... and I', II', III'.

The above and many other modifications may be made in the specific means of carrying out the invention and all such which come within the spirit and scope of the invention are believed to be covered in the claims.

What I claim is:

1. In a multiple-voltage system of motor control, including a source of balanced multiple supply, a compound wound motor and a controller having a number of double setting positions for throwing upon said motor consecutively the different pressures of the multiple supply, means to increase temporarily the shunt excitation of said motor when said controller is throwing upon said motor a greater pressure and to decrease temporarily said shunt excitation when said controller is throwing upon said motor a lesser pressure, a series wound motor mechanically connected with said source of multiple supply, and means operated by said controller and adapted to insert said series wound motor in the armature circuit of said compound wound motor in the first of each of said double position of rest which is reached, whether the rotation of said controller be clockwise or counterclockwise.

2. In a multiple-voltage system of motor control, a source of multiple-voltage supply, a motor having series and shunt field windings, a resistance in circuit with said shunt winding, a controller movable successively to a number of setting positions for throwing upon the motor consecutively the different voltages of said supply, an auxiliary controller drum provided with a pair of brushes connected to the terminals of said resistance, a plurality of contact elements arranged on said auxiliary drum to short-circuit said brushes in certain angular positions of said drum, and a lost-motion driving connection between said auxiliary drum and said controller whereby when said controller is moved in a starting direction to increase the voltage applied to said motor, said resistance is short-circuited as said controller is moved from one setting position to another, and upon moving said controller in a braking direction to decrease the applied voltage, said resistance is short-circuited in each setting position of said controller.

3. The combination specified in claim 2 wherein the lost motion coupling between the main controller and the auxiliary drum comprises a disc keyed to the shaft of the controller, a second disc keyed to the shaft of said drum, one of said discs being provided with a toothed element arranged to engage spaced stop elements on the other disc, said stop elements being spaced apart to permit relative motion between the two discs in different directions of rotation, and means for normally frictionally holding said auxiliary drum against movement by said controller, whereby the rotation of said auxiliary drum lags the rotation of said controller in either direction of movement.

4. In a multiple-voltage system of motor control, a source of multiple-voltage supply, a motor having series and shunt field windings, a resistance in circuit with the series winding, a controller movable successively to a number of double setting positions for throwing upon the motor consecutively the different voltages of said supply, and means embodied in said controller for rendering said resistance effective in said armature circuit when said controller rests in the first of each of said double positions regardless of the direction of movement of said controller, and means embodied in said controller to short-circuit said resistance when said controller rests in the second of said double positions regardless of its direction of movement.

5. In a multiple-voltage system of motor control, including a source of balanced multiple supply, a compound wound motor and a controller having a number of double setting positions for throwing upon said motor consecutively the different pressures of the multiple supply, means to increase temporarily the shunt excitation of said motor when said controller is throwing upon said motor a greater pressure and to decrease temporarily said shunt excitation when said controller is throwing upon said motor a lesser pressure, a resistance connected in series with the motor armature, and means operated by said controller for inserting said resistance in the armature circuit of said motor in the first of each of said double setting positions which is reached, and for short-circuiting said resistance in the second of each of said double positions, regardless of the direction of rotation of said controller.

6. In a multiple-voltage system of motor control, a source of balanced multiple-voltage supply, a motor having series and shunt field windings, a controller movable successively to a number of double setting positions for throwing upon the motor consecutively the different voltages of said supply, a resistance in circuit with said shunt winding, an auxiliary controller drum having a number of setting positions corresponding in angular displacement to the angular displacement between the double setting positions on said controller, circuit connections to said auxiliary drum controller for short-circuiting said resistance in said setting positions, a lost motion driving connection between said controller and said auxiliary drum whereby when said controller is moved in a direction for increasing the voltage applied to said motor, said resistance is short-circuited temporarily as said controller passes from a lower voltage to a higher voltage, and when said controller is moved in a direction to decrease the applied voltage, said resistance is short-circuited in each setting position of said controller, a resistance connected in the armature circuit of said motor, a second auxiliary drum having a number of setting positions corresponding in angular displacement to the angle between the double setting positions on said controller, circuit connections for short-circuiting said second resistance by said second auxiliary drum in said setting positions, and a lost-motion driving connection between said controller and said second auxiliary drum whereby said second resistance is short-circuited when said controller rests in the second of said double positions regardless of its direction of movement.

In testimony whereof I affix my signature.

GIACOMO SOMAJNI.